Nov. 22, 1966   C. J. MARSHALL   3,286,892
BRACKET ATTACHMENT FOR MOTOR VEHICLES
Filed March 25, 1965
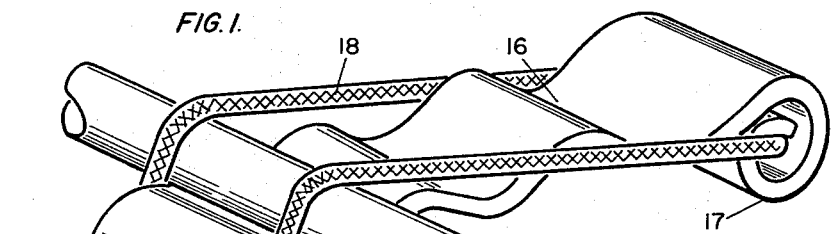
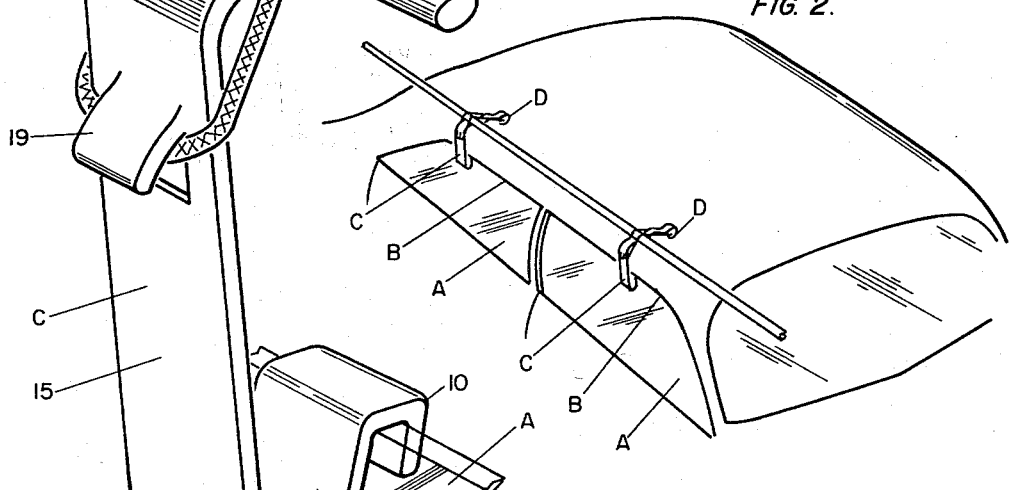
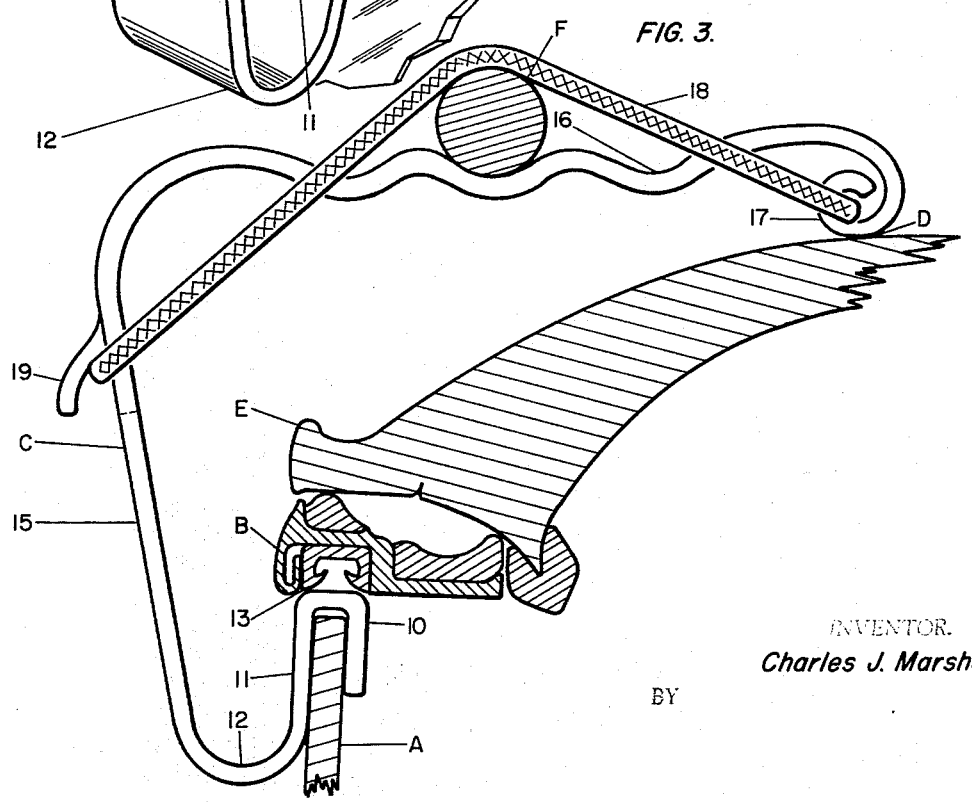
INVENTOR.
Charles J. Marshall
BY _United States Patent Office_

3,286,892
Patented Nov. 22, 1966

3,286,892
BRACKET ATTACHMENT FOR MOTOR VEHICLES
Charles J. Marshall, 1407 Santa Barbara St.,
San Diego, Calif.
Filed Mar. 25, 1965, Ser. No. 442,680
1 Claim. (Cl. 224—42.1)

This invention relates to improvement in means for transporting light weight poles, rods, pipe, fishing poles and like equipment upon an automobile or similar vehicle.

It is the object of the present invention to provide an efficient, inexpensive, simple construction, one piece bracket for mounting on the vertically sliding glass window pane of the vehicle and which is light, strong, soft surfaced and adaptable to vehicles having a channel upper rail of the window frame and a hard roof exterior surface.

It is another object of the invention to provide a bracket of the above description wherein the upper rail of the window frame, when the window is in its maximum closed position, will provide rigidity, wherein lateral stability is provided through the use of contact pressure between the invention extremity and the vehicle exterior roof top.

It is another object of the invention to provide a simple, efficient securing device for articles transported in the device that readily secures and allows quick disconnect release of articles transported within the said invention.

With the foregoing objects in view my invention consists in the combination, arrangement and details of construction disclosed in the drawings and specification, together with such other objects and advantages as may subsequently appear.

In the drawing: FIG. 1 is a perspective view representing the bracket mount and the manner in which a rod, pole, pipe, fishing pole and the like may be firmly positioned in the devices of the invention.

FIG. 2 is a general outline of the upper section of a vehicle to which the devices of the invention are shown mounted.

FIG. 3 is a side elevation of my invention as seen illustrating the mode of applying said invention to the vehicle window pane, the upper channel of the door and window frame and the exterior roof top of the vehicle.

Referring to the drawings, which are merely illustrative of my invention the various parts thereof are disclosed. The device of the invention in the form illustrated consists of a non-rotating, rigid metal and composition covered hanger clip made from metal strip of a uniform thickness and a bonded composition covering.

Referring to the drawings more specifically A designates the vertical sliding glass window pane of a motor vehicle and B indicates generally the channel upper rail of the window frame which encases the upper marginal portion of the window pane when the vertical sliding glass window A is in its uppermost closed condition, also illustrated is the invention C and its composition covered coiled spring pressure contact element which absorbs partial weight of items carried on the invention on the roof top D of the vehicle.

Referring to FIG. 1 the perspective drawing illustrates the invention C mounted astride the vertically sliding glass window pane A, wherein the article F transported is mounted atop the corrugated horizontal seating surface 16 and secured by the elasticized band 18 or cord tie down element attached to the coiled spring extremity 17 of the device and the hook clip 19.

Referring to FIG. 3, the side elevation illustrates the mode of mounting of the invention C on the vertically sliding glass window pane A. An inverted U configuration 10 within the invention is provided for positioning of the device astride the upper portion of the vertically sliding glass window pane A. The exterior downward parallel extension 11 of the inverted U configuration is parallel to the sliding window pane A. Upon mounting of the invention C astride the window pane A, the vertically sliding window pane A is closed to its maximum uppermost position to a condition wherein the device makes contact with the channel 13 of the upper door frame B of the sliding glass window pane A.

Reference to FIG. 3 illustrates the radial extension 12 of the bracket arm away from the sliding window pane A and a lateral bias 15 of the arm with respect to the adjacent side of the vehicle wherein clearance for the bracket, as it extends vertically to an elevation above the drip gutter E, wherein the horizontal seating surface extension 16 of the bracket is over and above the drip gutter E and its adjacent vehicle roof top surface to a condition wherein the coiled spring extremity 17 contacts the vehicle roof top D.

In order to frictionally confine and pressure secure the articles to be transported on the device against displacement from the invention, utilization is made of an elasticized band 18 or cord tie-down element attached to the composition coated coiled spring extremity 17, said band 18, attached within the coiled extremity, is looped over the article F to be transported and drawn over the hook clip 19 on the lateral bias extension surface 15. Positioning of the article F transported upon the horizontal corrugated seating surface 16 of the composition coated surfaces of the devices is completed upon looping of the elasticized band 18 or cord tie-down element over the article F with the free end of the band 18 looped or tied over the hook clip 19. The holding action of the elasticized band 18 or cord when secured to the hook clip 19 contributes a tension pressure upon the article F transported, a tension pressure upon the horizontal corrugated seating surface 16 of the device and upon the vehicle roof top D.

The bracket device thus illustrated and described is adaptable for support of long poles, rods, pipe, fishing poles and the like, for which purpose a pair of said brackets mounted on the vertically sliding glass window panes A on one side of the vehicle as illustrated in FIG. 3, thus providing a pair of spaced bracket support devices for rigid and stable transport of above cited articles.

While I have described and illustrated a specific embodiment of my invention I do not limit or confine myself to the exact details of construction set forth, and the invention embraces such changes, modifications and all variations falling within the purview of the appended claim.

What I desire to claim is:

A one-piece carrier for vehicles having a vertically sliding glass windowpane and a hard surface rooftop thereabove comprising a resilient, metallic bracket substantially L-shaped having a hook at the end of the short leg of the L-shaped bracket, said bracket being normally disposed with the hook over the top of the windowpane and the long leg of the L substantially horizontally oriented with the end in engagement with the roof under spring tension due to the resiliency of the bracket, said long leg of the L having corrugations to receive pole-like articles, an elastic strap to hold down articles in the corrugation and means on the bracket securing each end of the strap to the bracket.

References Cited by the Examiner
UNITED STATES PATENTS

| | | | |
|---|---|---|---|
| 2,474,513 | 6/1949 | Behrens | 224—42.45 |
| 2,536,797 | 1/1951 | Cooke | 224—42.45 |
| 2,634,034 | 4/1953 | Heck | 224—42.1 |
| 2,797,851 | 7/1957 | Leake | 224—42.45 |

GERALD M. FORLENZA, *Primary Examiner.*
F. WERNER, *Assistant Examiner.*